8/19/86 XR 4,607,257

United States Patent [19]
Noguchi

[11] Patent Number: 4,607,257
[45] Date of Patent: Aug. 19, 1986

[54] REMOTE CALIBRATING SYSTEM FOR SATELLITE TIME

[75] Inventor: Kazuhide Noguchi, Tokyo, Japan
[73] Assignee: Nippon Electric Co. Ltd., Tokyo, Japan

[21] Appl. No.: 453,786
[22] Filed: Dec. 27, 1982
[30] Foreign Application Priority Data
Dec. 25, 1981 [JP] Japan ............ 56-210316
[51] Int. Cl.[4] ............ H04Q 9/00; H04J 3/06; H04L 7/00
[52] U.S. Cl. ............ 340/825.69; 370/104; 455/12; 375/107; 368/46; 340/825.14
[58] Field of Search ............ 340/825.69, 825.14; 375/106, 107; 370/104, 108, 17; 455/69, 12; 368/46

[56] References Cited

U.S. PATENT DOCUMENTS

| | | | |
|---|---|---|---|
| 4,218,654 | 8/1980 | Ogawa et al. | 370/104 |
| 4,287,597 | 9/1981 | Paynter | 375/107 |
| 4,292,683 | 9/1981 | Jueneman | 370/104 |
| 4,334,314 | 6/1982 | Nard et al. | 375/106 |
| 4,368,987 | 1/1983 | Waters | 375/107 |
| 4,472,802 | 9/1984 | Pin et al. | 370/104 |

OTHER PUBLICATIONS

Time Transfer by Defense Communications Satellite, J. A. Murray, et al., pp. 186 through 193, 1971.
Time Transfer Using Navstar GPS, A. J. Van Dierendonck, et al., National Telecommunications Conference, Nov. 29–Dec. 3, 1981, pp. F9.2.1 through F9.2.10.

*Primary Examiner*—Donald J. Yusko
*Attorney, Agent, or Firm*—Laff, Whitesel, Conte & Saret

[57] ABSTRACT

A remote time calibrating system has a calibrating station with a reference time and a remote station having a local time, the local time having to be adjusted to coincide with the reference time. The calibrating station receives telemetry signals sent from the remote station, each of the telemetry signals including data indicating the local time of the remote station from which the telemetry signal is transmitted. Responsive to any first difference between the receive reference time and the local transmit time is detected and calculated by taking into account the signal propagation delay of the telemetry signal between the remote station and the calibrating station. Responsive thereto, the local time is calibrated at the remote station.

8 Claims, 19 Drawing Figures

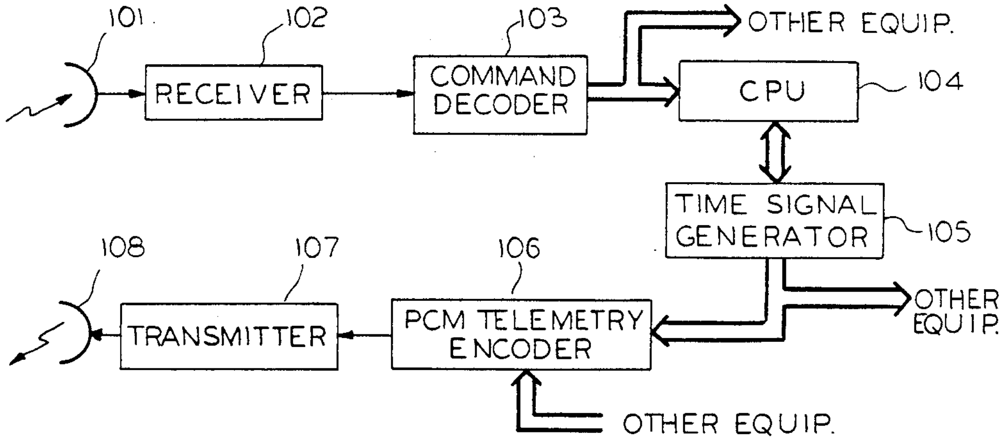
FIG. 2
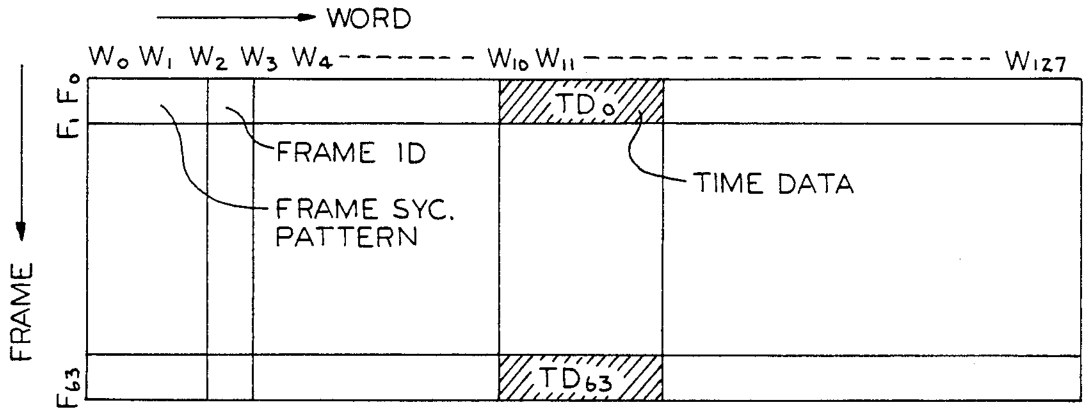
FIG. 3
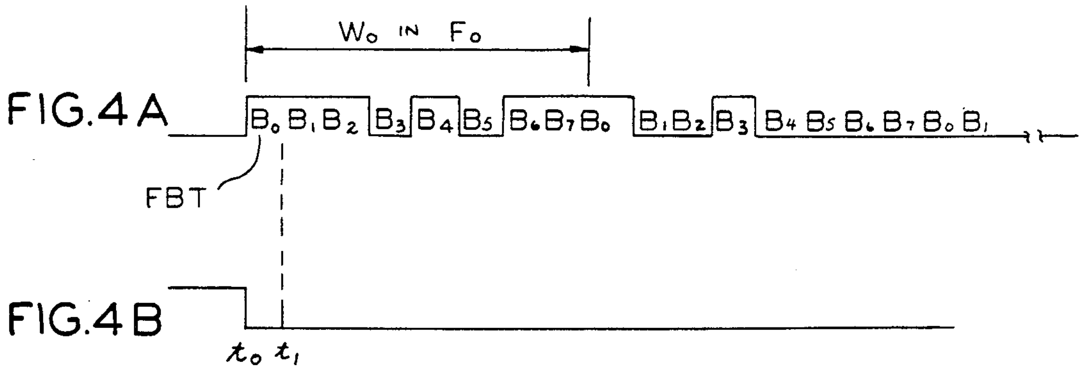

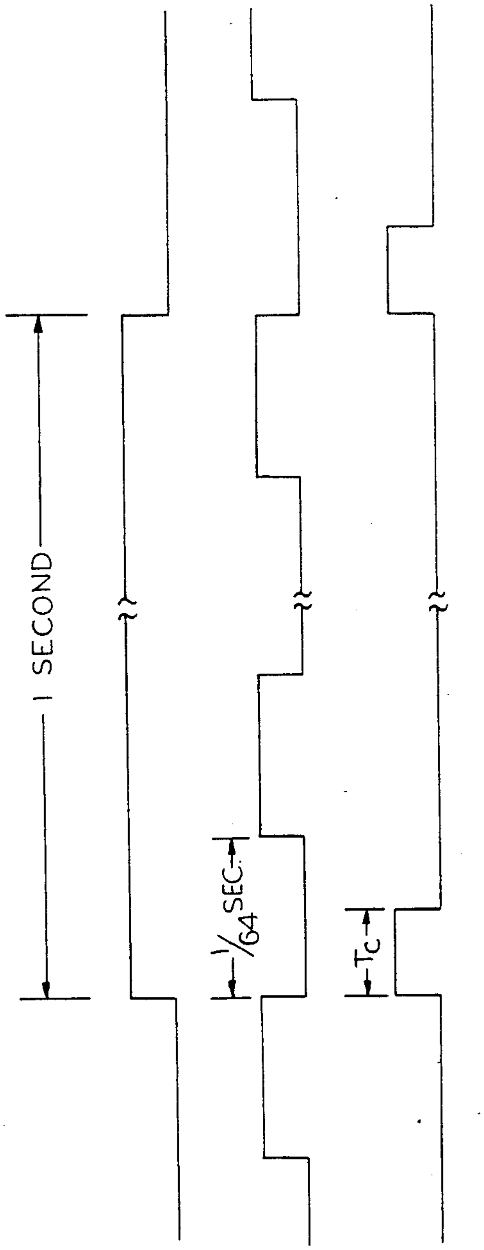
FIG.12A
FIG.12B
FIG.12C
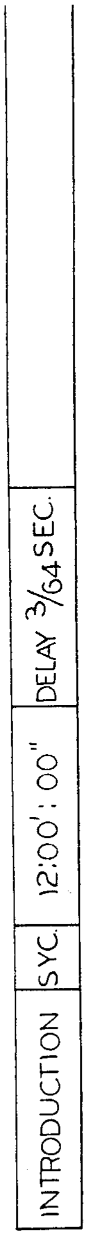
FIG.13

REMOTE CALIBRATING SYSTEM FOR SATELLITE TIME

BACKGROUND OF THE INVENTION

The present invention relates to a remote time calibrating system for accurately adjusting the local time of a geostationary (or synchronous) or asynchronous satellite having a time signal generating function, the local time adjustment being made to the reference time of an earth station.

On a satellite for earth exploration or astronomic observation, it is necessary to record the time of data acquisition and to transmit the time information, together with the acquired data, to an earth station. Such a satellite usually is equipped with its own time signal generating device, which may become inconsistent with the reference time on the earth, owing to aging or some other cause. A lag of the satellite time means a lag of the time of data acquisition, which would make accurate exploration or observation impossible. It is therefore desired to calibrate the satellite time so that it can precisely match the reference time on the earth station.

By the satellite time calibration system of the prior art, first a time calibrating command is transmitted from the earth station to the satellite. Then, the command is decoded in the satellite to achieve the calibration. Where the satellite is an asynchronous type, its distance from the earth station varies from moment to moment. The time at which the calibrating command is transmitted from the earth station is set in advance. In this case, the calibrating value contained in the calibrating command should incorporate the propagation delay of the command. This delay is obtained by forecasting the distance to the satellite at the time of transmission on the basis of its orbit data, the delay of the internal command transmitter, and the time delay between the command receiver and the command decoder in the satellite.

Where the satellite is of geostationary type, the distance scarcely varies with the time. Nevertheless, a unilateral calibrating command is transmitted from the earth station to the satellite, and accordingly the transmission time of the calibrating command is precisely controlled. Also incorportated into the calibrating command is the time delay resulting from a propagating from the command encoder in the earth station to the command decoder in the satellite.

As evident from the foregoing explanation, the conventional system has the following disadvantages. The calibrating command is always unilaterally sent from the earth station to the satellite; thus, the command transmission time at the earth station has to be precisely controlled. Moreover, the calculated propagation delay from the earth station to the satellite is nothing more than a forecast, and accordingly cannot be fully accurate. This lack of accuracy is particularly conspicuous if the satellite is of an asynchronous type.

Since the transmission time of the time calibrating command is the same as the time at which the satellite time is calibrated except for the propagation delay, the calibration is accomplished within a visible period if the satellite is of an asynchronous type. Only during the visible period, can the earth station transmit to and receive from the asynchronous satellite. Since the satellite is usually collecting data during a visible period, the collected data accompanying the time data will not be continuous, resulting in inconveniences in data processing or the like.

SUMMARY OF THE INVENTION

Therefore, an object of the present invention is to provide a time calibrating system which is capable of transmitting, at any time, a calibrating command from an earth station to a satellite.

Another object of the invention is to provide a time calibrating system capable of calculating the propagation delay on the basis of measured values instead of forecasts.

Still another object of the invention is to provide a time calibrating system capable of achieving, at any time, the time calibration on a satellite.

According to the present invention, a remote time calibrating system comprises a calibrating station having a reference time and a remote station having a local time. The local time has to be adjusted to match the reference time. The calibrating or earth station comprises first means for receiving telemetry signals which are sent from the remote or satellite station, each of the telemetry signals including data indicating the local time of the remote station at which the telemetry signal is transmitted Responsive to the output of the first means, a second means detects a first difference between the receive reference time at which the telemetry signal is received and the transmit local time which is derived from the received telemetry signal. A third means calculates the propagation delay of the telemetry signal between the remote station and the calibrating station. A fourth means responds to the outputs of the second and third means for detecting a second difference between the reference time and the local time. A fifth means is responsive to the second difference for transmitting a time calibrating command to the remote station.

BRIEF DESCRIPTION OF THE DRAWINGS

Other objects, features and advantages of the present invention will be more apparent from the following detailed description taken in conjunction with the accompanying drawings, wherein:

FIG. 2 is a partial block diagram which is pertinent to time calibration in a satellite as illustrated in FIG. 1;

FIG. 3 shows the format of a pulse-code-modulation (PCM) telemetry signal according to the present invention;

FIGS. 4A and 4B are time charts showing the synchronous relationship between the satellite time data and the PCM telemetry signal according to the present invention;

FIGS. 12A to 12C are charts for describing the processing time of the CPU referred to in FIG. 9; and FIG. 13 shows a typical signal format of a delay command.

DETAILED DESCRIPTION OF THE PREFERRED EMBODIMENTS

Figure 1:
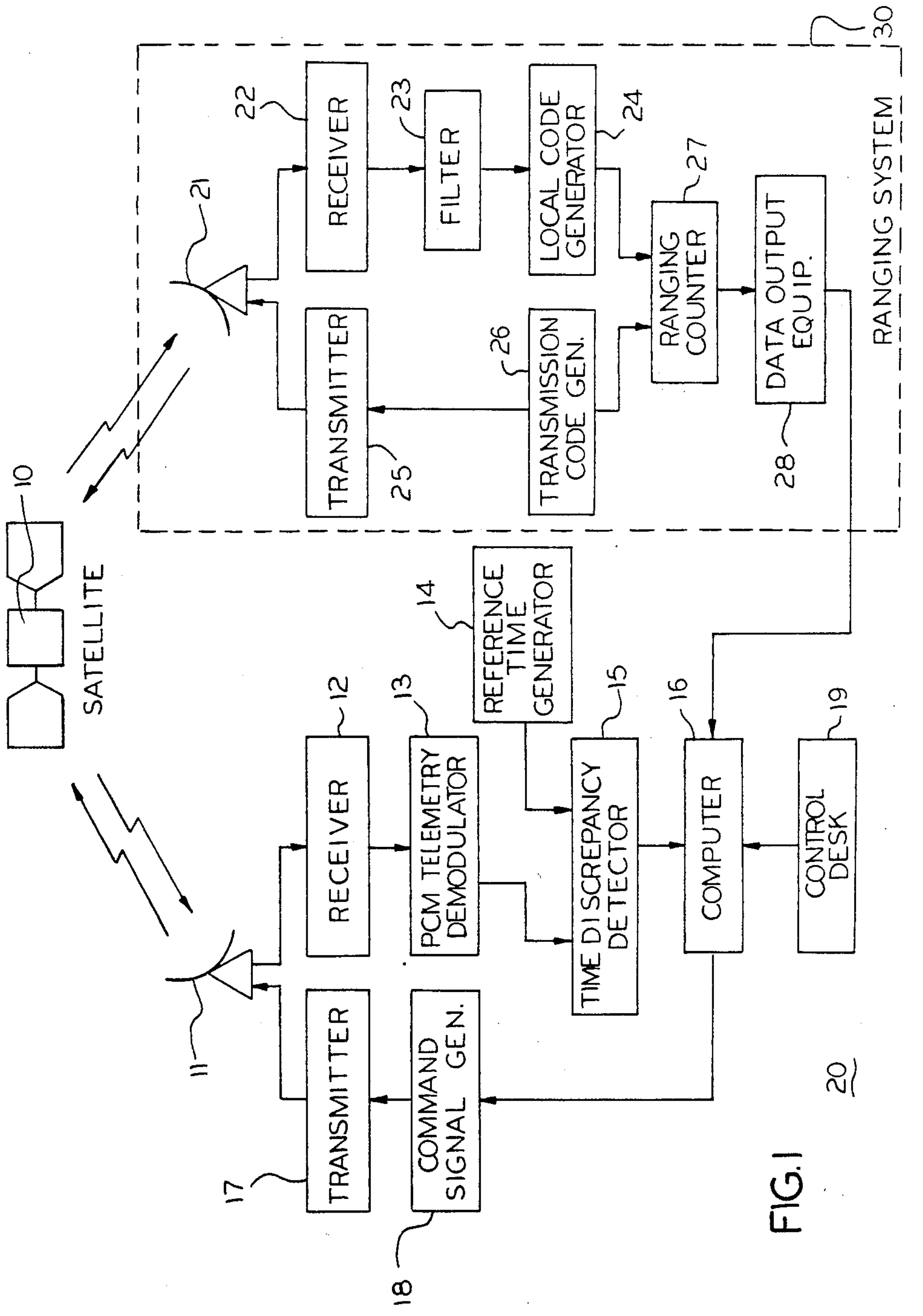
FIG. 1 is a schematic block diagram of a time calibrating system according to the present invention.

Referring to FIG. 1, a satellite 10 in space is executing various operations, including data collection and attitude control, responsive to commands from an earth station 20. A command for controlling the satellite 10 is entered from a control desk 19 and others into a computer 16, which prepares from this command a command data in a format matching the communication needs of satellite 10 and feeds it to a command signal generator 18. The command signal generator 18 converts the command data into a serial code, which, as a command signal, is supplied to a transmitter 17. The transmitter 17 modulates a carrier wave with this command signal, and transmits the resulting modulated carrier to the satellite 10 through antenna 11.

Meanwhile, data collected by the satellite, data indicating the conditions of various parts thereof, and other information (in a PCM signal form) are transmitted, as telemetry signals, from the satellite 10 to the earth station 20. These telemetry signals, as will be explained in detail below, are accompanied by satellite time signals. The telemetry signals are received by a receiver 12 via the antenna 11. After being frequency-converted and otherwise processed, the signals are fed to a PCM telemetry demodulator 13, which demodulates the telemetry signals to obtain telemetry data.

These telemetry data are supplied to other units, in the form of parallel data. Time data among them are supplied to a time discrepancy detector 15, which, as will be described in detail below, compares reference time data from a reference time generator 14 and the time data from the telemetry data. Detector 15 then informs the computer 16 of any discrepancy between them. On the basis of this discrepancy data, the computer 16 figures out the calibration value for the satellite time, and supplies it, as a command data, to the command signal generator 18, either automatically or manually. The satellite 10 responds to this time calibration command, as it does to any ordinary command, and calibrates its local time.

For calculating the time calibration value, the propagation delay time ($T_D$) of the telemetry signal has to be known. This delay time $T_D$ is the sum of a delay time required for a signal to move from the telemetry encoder to the transmitter section of the satellite ($\tau_1$), another delay time is required for propagation of a signal from the satellite to the earth station ($\tau_2$), and still another delay time is required for propagation of a signal from the receiver section to the time discrepancy detector 15 of the earth station ($\tau_3$). The delay times $\tau_1$ and $\tau_3$ can be measured in advance, and accurately known because they are constant. The delay time $\tau_2$ is calculated, based on the distance between the earth station 20 and the satellite 10, as measured by a ranging system 30. The delay time $\tau_2$, used for figuring out the calibration value under the present invention, is not a forecast value, but is a measured value used when a time data is inserted into a telemetry signal in the satellite. It is highly accurate.

The ranging system 30 is outlined below, although no detailed description will be given herein because it is not directly related to the present invention. With a ranging signal generated from a transmission code generator 26, a carrier wave is modulated at a transmitter 25, and transmitted to the satellite 10. The transmitted signal is sent back to the ranging system 30 after being relayed by the satellite 10. A receiver 22 demodulates signals sent from the satellite 10, and the noise therein is suppressed by a filter 23. Each signal, whose S/N ratio is improved by the filter 23, is fed to a local code generator 24 to generate a local code. The time difference between the transmission code and the local code is detected by a ranging counter 27, to accomplish ranging. The result of this ranging is supplied by a data output equipment 28, to the computer 16.

Referring now to FIG. 2, a receiver 102 receives a demand signal through an antenna 101, demodulates it and supplies the demodulated signal to a command decoder 103. The command decoder decodes the demand signal and then supplies the decoded signal to a CPU 104 and other relevant units in the satellite. The CPU 104 controls a time signal generator 105 according to the demand signal, and calibrates the time data to be inserted into the telemetry data. The calibrated time data is supplied from the time signal generator 105 to a PCM telemetry encoder 106, where it is multiplexed with PCM data from other satellite equipment. A transmitter 107 modulates a carrier wave with the PCM telemetry data, into which the time data has been inserted, frequency-converts and otherwise processes the modulated signal. Then it is transmitted by way of an antenna 108 to the earth station.

FIG. 3 shows a typical format of a PCM telemetry signal sent from the satellite 10. In this example, each superframe or majorframe comprises 64 subframes or minorframes $F_0$ to $F_{63}$, which are sent out in the numerical order of their subscripts. Each of the minorframes $F_0$ to $F_{63}$ consists of 128 words $W_0$ to $W_{127}$, each word comprising eight bits. The first three words $W_0$ to $W_2$ of each minorframe constitute a frame synchronization pattern. The fourth word $W_3$ is a frame identification (ID) word. The remaining words $W_4$ to $W_{127}$ make up telemetry data. As represented by oblique lines in the chart, into a few data words $W_4$ to $W_{127}$ are inserted time data $TD_0$ to $TD_{63}$ each of which indicates the satellite time of the corresponding minorframe. Each of time data $TD_0$ to $TD_{63}$ comprises digits indicating "second".

Now supposing that the bit rate of the PCM signal is 1024 bits per second (bps), it will take one second to send out each minorframe. The time that data $TD_0$ to $TD_{63}$ will be counted up by one second every time a minorframe is sent out. If the bit rate is slowed down to 512 bps, it will take two seconds to send out each minorframe Accordingly, after such slowing, the time data will be counted up by two seconds every time a minorframe is sent out. Conversely, if the bit rate is accelerated to 2048 bps, two minorframes will be sent out per second. Then, time data will remain the same for two consecutive minorframes. Thus the time data will be counted up or down differently, according to the bit rate of the PCM signal.

The synchronous relationship between the satellite time data and the PCM telemetry signal is shown in FIGS. 4A and 4B. FIG. 4A shows a part of the beginning of the minorframe $F_0$ of the PCM telemetry signal shown in FIG. 3. FIG. 4B shows the timing of "second" of the satellite time. Thus the leading edge of the first bit (FBT) of the first word $W_0$ of each minorframe is synchronous with the starting point of one second of the satellite time. The sampling of the time data $TD_0$ to $TD_{63}$ is timed on the leading edge of the second bit $B_1$ of the first word $W_0$ of each minor-frame, to avoid the instability resulting from the transition of the time data.

Because of this time relationship, any digit of or lower than the second of the satellie time can be known on the leading edge of each bit. For instance, if the bit rate is 512 bps and the time data of the minorframe $F_0$ is 12:00':00", the leading edge of the FBT $B_0$ of the first word $W_0$ of the minorframe $F_0$ will indicate exactly 12:00':00". The leading edge of the second bit $B_1$ indicates, 12:00':1/512". Similarly the leading edge of the FBT $B_0$ of the second word $W_1$ will indicate 12:00':1/64". The time can thus be accurately known to fractions of a second. Accordingly, the leading edge of the FBT $B_0$ of the central word $W_{64}$ of the first minorframe $F_0$ will be 12:00':01". The leading edge of the FBT $B_0$ of the first word $W_0$ of the second minor frame $F_1$, 12:00':02". The time data of each minorframe is counted up by two seconds, as stated above. Similarly, if the bit rate is 1024 bps and 2048 bps, the leading edges will be advanced by one second and a half second, respectively, per minorframe. Therefore, the time data will be counted up by one second per minorframe if the bit rate is 1024 bps, or by one second for every two minorframes if the bit rate is 2048 bps.

As is evident from the foregoing description, the formula of time data insertion into PCM telemetry signals, according to the present invention, requires the bit rate of the PCM signals to be $2^n$ (n is a positive integer). However, this formula cannot be used where the bit rate is an odd number or any multiple of 10.

Figures 5A, 5B, 5C, 5D:
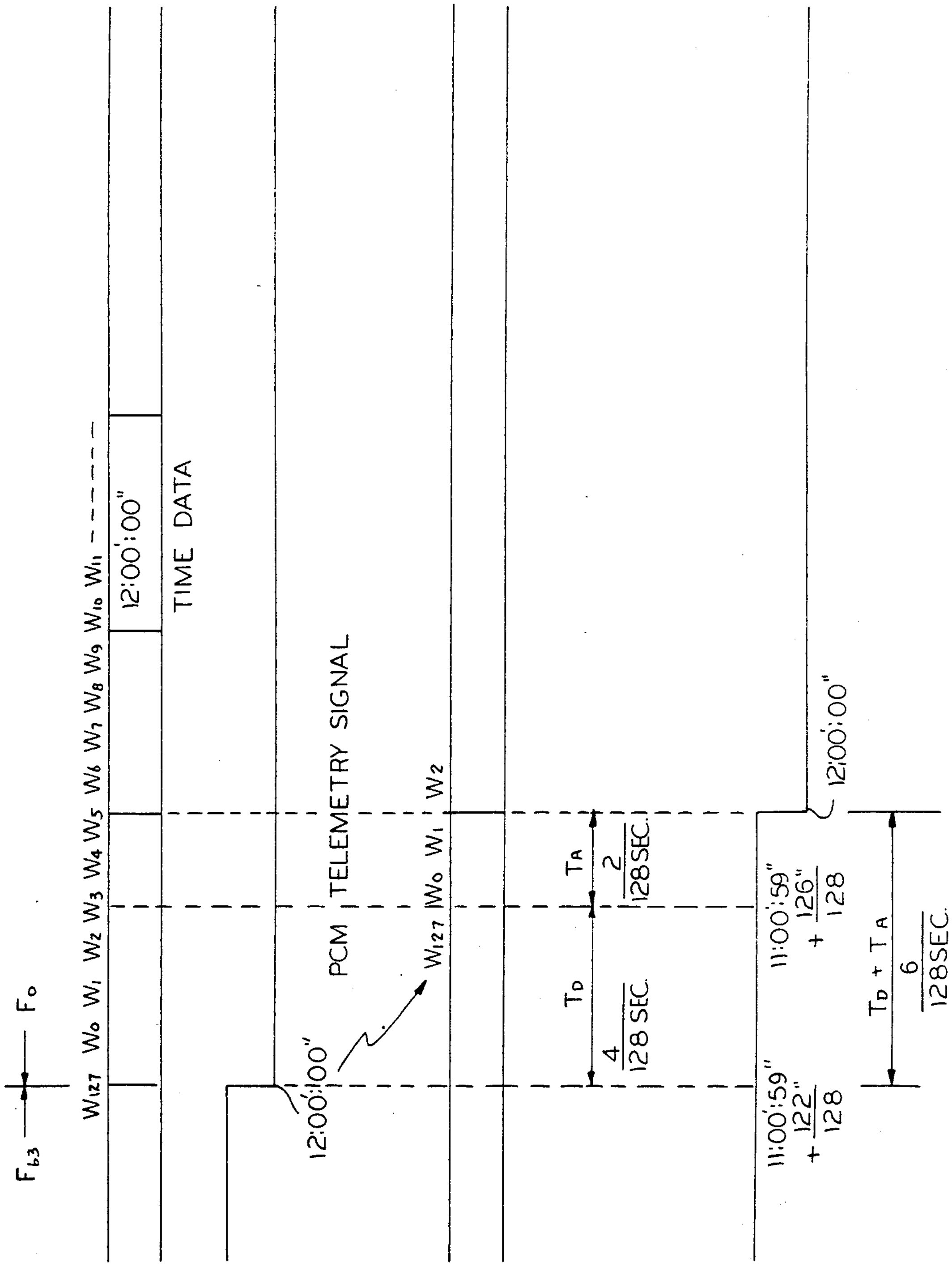
FIGS. 5A to 5D are time charts for describing the formula for detecting the time lag on the satellite at the earth station illustrated in FIG. 1.

FIG. 5A illustrates the timing of the transmission of PCM telemetry data from the satellite. As drawn, FIG. 5A refers to an instance where the beginning of the first minorframe $F_0$ is at 12:00':00". Accordingly, the trailing edge timing, representing the digit of a second of the satellite, is as shown in FIG. 5B. The data indicating the time 12:00':00" is inserted into a few words which are preferably four words and starts from the word $W_{10}$. The bit rate of this PCM telemetry signal is 1024 bps, i.e., 128 words per second (wps).

The PCM telemetry signal of FIG. 5A is transmitted to the earth station. The signal is provided by the PCM telemetry modulator of the earth station (FIG.1) as its output in a timing illustrated in FIG. 5C. The internal $T_D$ is the total transmission delay time combining the delay time of the satellite transmitter section ($\tau_1$), the delay of transmission between the satellite and the earth station ($\tau_2$) and the delay of the earth station receiver section ($\tau_3$). As stated above, the delay times $\tau_1$ and $\tau_3$ can be accurately measured in advance. The delay time $\tau_2$ is a value obtained on the basis of the distance between the satellite and the earth station, as measured by the ranging system. The delay time $T_D$ is supposed to be 4/128 second here. A time $T_A$ represents the discrepancy between the satellite time and the earth station reference time (FIG. 5D), with no regard for the transmission delay time $T_D$. Here time $T_A$ is 2/128 seconds. This time discrepancy $T_A$ is detected by the time discrepancy detector referred to in FIG. 1 and described in detail below.

The computer 16 of the earth station (FIG. 1) calculates on the basis of the transmission delay time $T_D$ and the time discrepancy $T_A$. The calculation finds the real discrepancy ($T_D + T_A$) between the satellite time and the earth station reference time. Thus, the earth station reference time might be as illustrated in FIG. 5D. The satellite time is found to be ahead of it by 6/128 (i.e., 3/64) second. According to this calculated result, a command data signal is sent to the command signal generator (FIG. 1).

Figure 6:
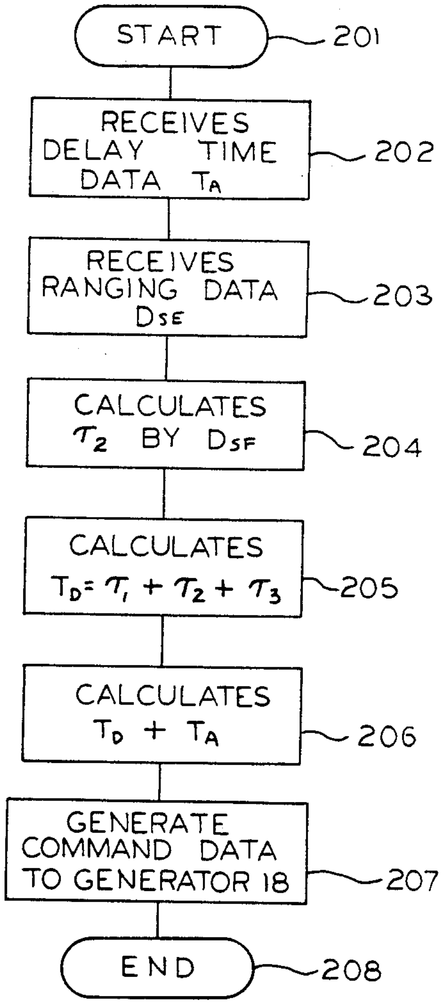
FIG. 6 is a flow chart of the calculation of the discrepancy between the satellite time and the reference time by the earth station computer referred to in FIG. 1.

The processing flow of the computer 16, to detect the time discrepancy, is shown in FIG. 6. In FIG. 6, first at step 202, the delay time data $T_A$ is received from the time discrepancy detector. Time $T_A$ does not take into account the transmission delay time $T_D$. At step 203, a distance data $D_{SE}$ from the ranging system. The delay time $\tau_2$ is calculated from the distance data $D_{SE}$, and then the total delay time $T_D$ ($\tau_1+\tau_2+\tau_3$) is calculated (steps 204 and 205). From this transmission delay time $T_D$ and the delay time $T_A$ is calculated the time to be compensated for, $T_D+T_A$, at step 206. Finally, at step 207 is supplied a calibration command data to the command signal generator.

Figure 7:
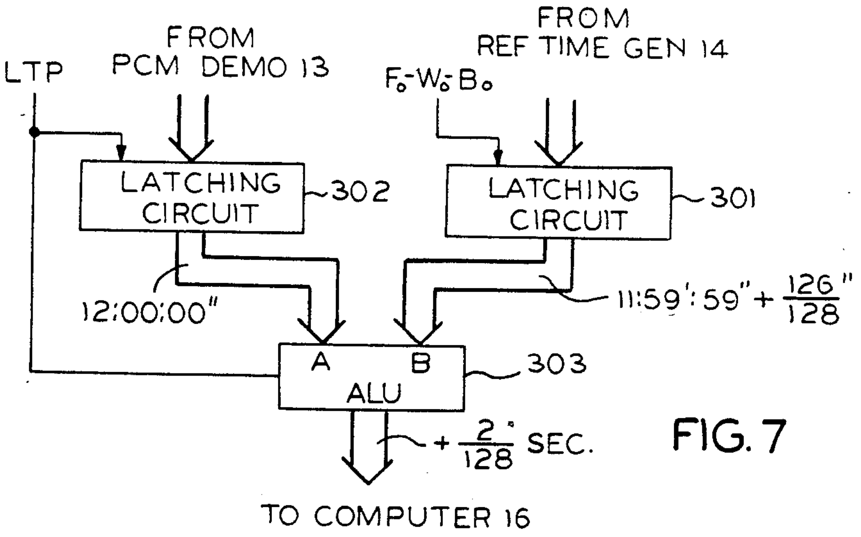
FIG. 7 is a more detailed block diagram of the time discrepancy detector referred to in FIG. 1.

The time discrepancy detector 15, as referred to in FIG. 1, will now be described in detail with reference to FIG. 7, in terms of the timing illustrated in FIGS. 5A to 5D. The time discrepancy is assumed to be 2/48 seconds, with the satellite time ahead of the reference time. A reference time data (indicating digits down to 1/128 second or below) is supplied from the reference time generator 14 and is latched into a latching circuit 301 in response to the leading edge of the pulse. For instance, this may be the FBT $B_0$ of the first word $W_0$ of the first minorframe $F_0$ from the PCM demodulator 13 (FIG. 1). This time data, as shown in FIG. 5D, is 11:59':(59+126/128)".

Meanwhile, into another latching circuit 302 is latched a time data $TD_0$ of the minorframe $F_0$ from the PCM demodulator 13, in response to a time data latching pulse LTP which is also supplied from the PCM demodulator 13. This time data $TD_0$, as shown in FIG. 5A, is 12:00':00". Upon the latching of the time data $TD_0$, a subtractor 303 subtracts, in response to the pulse LTP, the output of the latching circuit 301 (input B) from the output of the latching circuit 302 (input A). As a result, the substrator 303 gives, as its output, a data signal indicating +2/128 second. This signal is supplied to the computer 16. As is obvious from the foregoing description, a positive result of the subtraction means that the satellite time is ahead of the earth station reference time. A negative result means that the satellite time is behind the earth station time. The subtractor 303 can be a circuit AM2901 manufactured by Advanced Micro Devices Inc.

Figure 8:
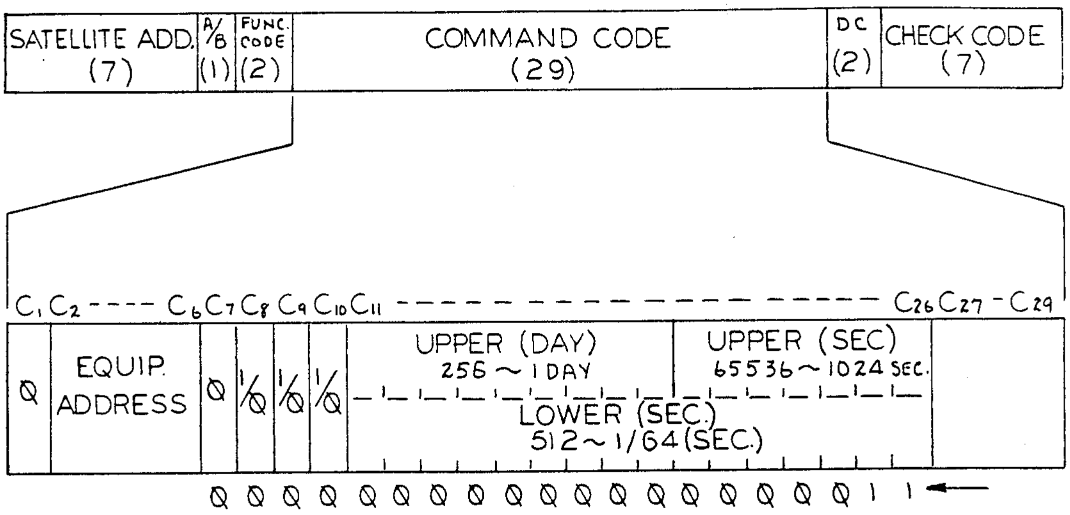
FIG. 8 illustrates a typical signal format of a calibrating command generated by the command signal generator in FIG, 1.

The calibration command illustrated in FIG. 8 has a format which is usable where the least significant bit (LSB) of the satellite time data is 1/64 second. The satellite is equipped with a time data generating counter which indicates a day in total seconds, counts a day's increment in every 86,400 seconds (24 hours) and then returns to the seconds count to "0". In this instance, the tolerance of the calibration is 1/64 second. The first seven bits represent the address of the satellite, and the next bit is used for choosing either the ordinary (A) or the backup (B) systems installed in the satellite. The two bits of a function code indicate the function of the following command code of 29 bits, which is followed by two dummy bits. The final seven bits constitute a check code.

The first bit $C_1$ of the command code indicates whether the command is a pulse command or a serial magnitude command. The following five bits $C_2$ to $C_6$ constitute an equipment address. A bit $C_7$ indicates that the command is a time calibration command. A bit $C_8$ indicates whether calibration is to be achieved by initial setting or difference correction. The initial setting is a rough setting at the time of power turn-on, and is not directly relevant to the present invention. The next bit $C_9$ shows whether the calibration data entering into $C_{11}$ to $C_{26}$ are intended for the calibration of the upper digits from 265 days to 1024 seconds or the lower digits from 512 seconds to 1/64 second. A bit $C_{10}$ shows whether the time is to be advanced or delayed in difference calibration. Calibration data bits $C_{11}$ to $C_{26}$, as illustrated, may indicate either the lower or the upper digits. The final three bits $C_{27}$ to $C_{29}$ are dummy bits, which are usually "0". When the satellite time is 3/64 seconds ahead as described above, with reference to FIG. 5. The calibration command has to delay that time by 3/64 second.

The calibration command has to include information that the satellite time is to be delayed by 3/64 seconds. For this purpose, the format of the bits $C_7$ to $C_{26}$ are as indicated by an arrow under the command code shown in FIG. 8. Thus, all bits are "0", except for the last two bit positions ($C_{25}$ and $C_{26}$).

Figure 9:
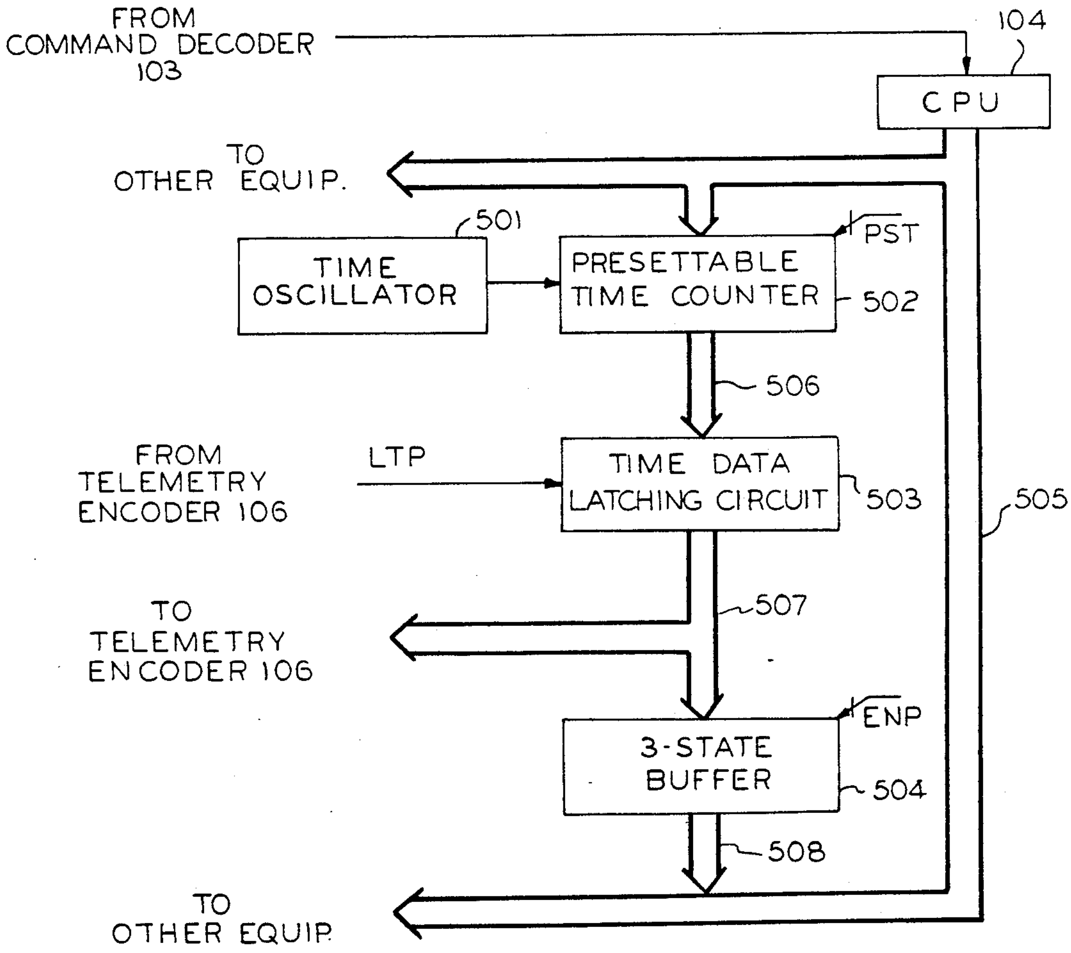
FIG. 9 is a more detailed block diagram of the time signal generator referred to in FIG. 2.

Now will be described with reference to FIG. 9 a case in which the counter is set so that the time signal generator 105 (FIG. 2) can handle the command signals shown in FIG. 8. From a clock pulse train generator 501 is supplied a 1/128-second clock to a presettable time counter 502. Counter 502 comprises a 16-bit counter which counts the 1/128-second clock to provide a reference time of 1/64 to 512 seconds. A seven-bit counter is tandem-connected to the counter 701 and counts its output to provide a reference time of 1,024 to 65,536 seconds. The presettable counter 502 further comprises a nine-bit counter 703 which is coupled to the 16-bit and seven-bit counters and counts their outputs to provide a reference time of 1 to 256 days. The 32-bit outputs of 16-, 7- and 9-bit counters are connected to the bus 506. Accordingly, the least significant bit and the most significant bit (MSB) of the time data TD supplied from the time counter 502 to the output bus 506 represent 1/64 second and 256 days, respectively.

The time data TD is latched into a latching circuit 503 in response to a timing pulse LTP representing the first bit of the initial word $W_0$ of each minorframe, as given by the PCM telemetry encoder 106 (FIG. 2). The LSB of this latched data is one second, because the word $W_0$ is always timed to a one-second varying point. The time data emerging on the bus 507 of the latching circuit 303 is not only supplied to the PCM telemetry encoder, but is also coupled to a 3-state buffer 504. In the absence of an enable signal ENP from the CPU 104, buffer 504 has a high output impedance and is thereby isolated from a CPU data bus 505. The CPU 104, supplies the enable signal ENP to the buffer 504, and takes in satellite time data by way of buses 508 and 505. When the satellite time is to be corrected, the CPU 104 supplies, a preset time data to the presettable time counter 502 via the CPU data bus 505, and the data is set responsive to a preset trigger pulse PST.

Figures 10, 11:
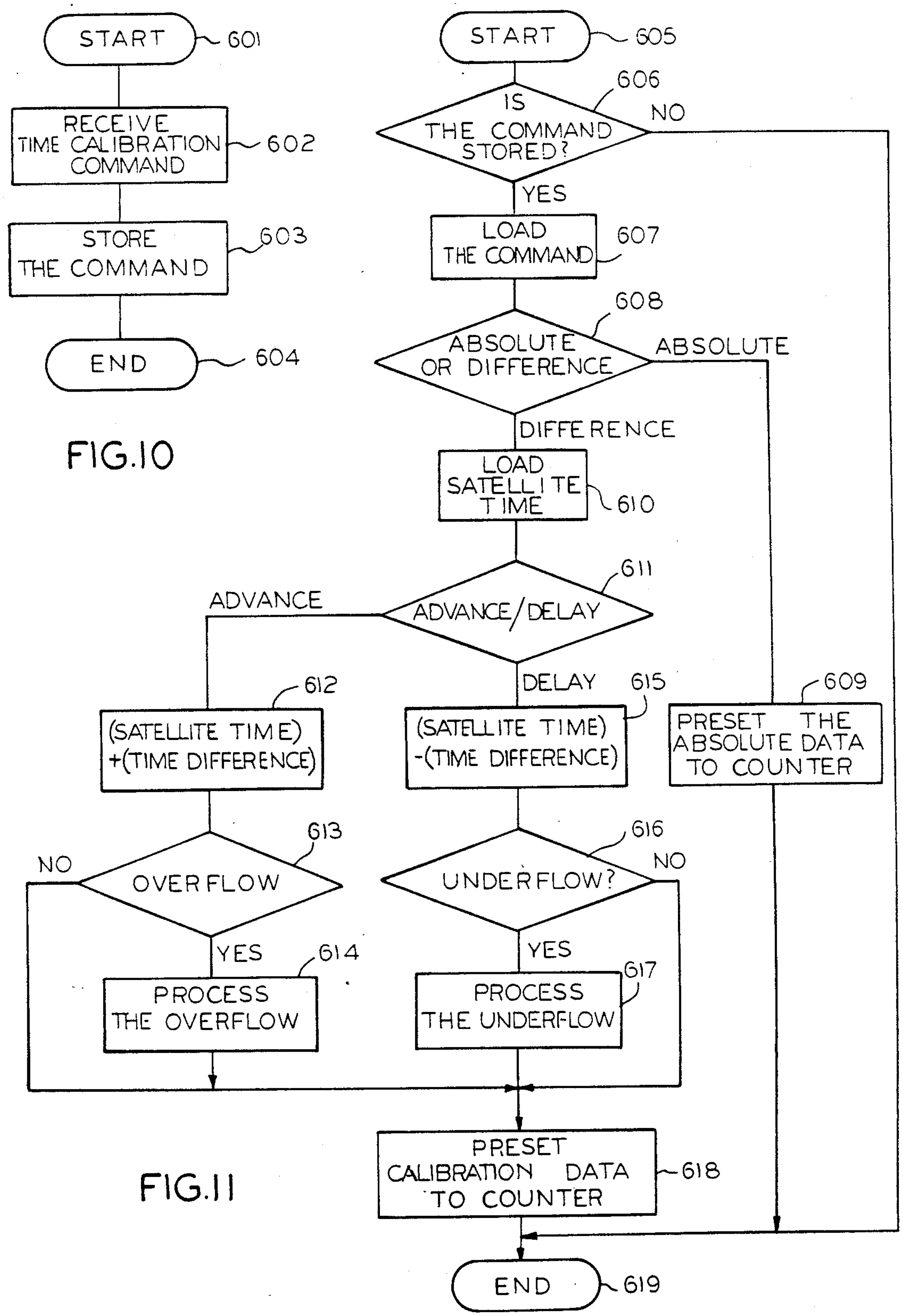
FIGS. 10 and 11 show the processing flow of the central processing unit (CPU) when the time is calibrated with the time signal generator illustrated in FIG. 9.

Referring now to FIG. 10, the CPU 104 acquires at step 602 a time calibration command sent from the earth station, and temporarily stores it in a time calibration memory at step 603.

Next, with reference to FIG. 11, the CPU 104 starts a calibration flow or sequence timed to the varying point of the one-second digit of the satellitetime data (step 605). At step 606, a decision is made as to whether or not the calibration command is stored in the time calibration memory area. If the command is found to have been stored, first it is loaded from the memory into the CPU 104 (FIG. 2) at step 607, and at step 608 a decision is made as to whether the absolute value of the time or its difference is to be calibrated. An absolute value calibration means that, for instance, the time of the first minorframe $F_0$ should be corrected to 12:00':00". A difference calibration requires, for example, the time of the first minorframe $F_0$ to be delayed by 3/64 second. In an absolute value calibration, the time counter 502 (FIG. 9) is preset as described above (step 609).

In a difference calibration, the satellite time is loaded into the CPU 104 (step 610), and a decision is made as to whether it is to be advanced or delayed at step 611. If it is it be advanced, the flow moves on to step 612, where the calibration value is added to current satellite time. If an overflow is involved, its processing is also achieved (steps 613 and 614). If the satellite time is to be delayed, the calibration value is subtracted from the current time at step 615. In this case, too, if an underflow is involved, its processing is achieved (steps 616 and 617). The calibrated time data which is obtained is preset on the time counter 502, to complete the calibrating procedure.

In this example, the length of time required from step 606 to step 169 should desirably be no longer than 1/64 second. Thus, as illustrated in FIGS. 12A to 12C, in order to calibrate a time signal whose LSB is 1/64 second with a tolerance of 1/64 second, the length of time during which the calibration is accomplished is required to be no longer than 1/64 second. FIG. 12A shows the digit of one second in the satellite time data; FIG. 12B shows the digit of 1/64 second in same, satellite data; and FIG. 12C shows the calibration processing time $T_C$ for the calibration.

If a time data is read in during the digit of 1/64 seconds, for the calibrating purpose and, during the calculation of the calibration value on the basis of the data read in, the 1/64 digit of the time counter is counted up. There will emerge a 1/64-second discrepancy from the value read in for the calibrating purpose, and the 1/64-second discrepancy will be carried over into the calibrated value. If, however, the processing time ($T_p$) is within the following range, compensation is possible (by making in advance a corresponding addition to the value read in for the calibrating purpose):

$$1/64 < T_p < 2/64$$

In making a difference calibration, as is obvious from the foregoing explanation, it will be inconvenient if there may be or may not be a 1/64-second varying point between the reading-in of data for the calibrating purpose and the presetting of a new calibrated time data. Therefore, the starting time of the processing is synchronized with a varying point of the one-second digit. The processing is completed within 1/64 second; therefore, both the software and the hardware can be most simplified. The present inventors have achieved a processing time $T_C$ of about 500 μs with their test system.

Since the system according to the present invention synchronizes PCM telemetry signals with the timing of time signals, this timing will be momentarily lost when a time signal is calibrated. As a result, part of the PCM telemetry signals would be lost to a resumption of synchronization. This loss would invite a momentary unlocking of PCM frames in the earth station. An asynchronous satellite is collecting data within the visible period. Therefore, partial data might be lost during the visible period owing to frame unlocking, and that would be undesirable. Therefore, the time can as well be calibrated by the combined use of a following delay command when activates calibration after the satellite has gone out of the visible period.

The delay command, means that, when a calibrating command is transmitted, its execution time is sent together with the command. Then, the calibration is executed at a predetermined time. A transmission format of such a delay command is shown in FIG. 13. The data of a time when the asynchronous satellite is out of vision, 12:00':00" for instance, and a command data for delaying by 3/64 second are inserted, in advance as illustrated. If the time signal generator in the satellite achieves calibration at the specified time, 12:00':00", in accordance with this command, the calibration will take place out of the visible period and will have been completed by the time the satellite re-enters the visible period.

The time calibrating system according to the present invention has to take into account only the delay time of PCM telemetry signals from the PCM encoder of the satellite until they reach the time discrepancy detector of the earth station. Calibration in the satellite is executed irrespective of the control time of the earth station. Accordingly, the transmission timing of a calibration command from the earth station can be freely selected, and no precision is required in its setting. The propagation delay time used for calculating the overall delay time is a measured value, instead of a forecast value, and therefore is highly accurate. Further in the case of an asynchronous satellite, the discontinuity of data acquisition can be eliminated by the use of delay command calibration.

What is claimed is:

1. A remote time calibrating system comprising a calibrating station having a reference time and a remote station having a local time, wherein said remote station comprises time adjusting means responsive to a time calibrating command for adjusting said local time, and wherein said calibrating station comprises:

first means for receiving telemetry signals sent from said remote station, each of said telemetry signals including data indicating the local time of said remote station at which the telemetry signal is transmitted;

second means responsive to the output of said first means for detecting a first time difference between the receive reference time at which said telemetry signal is received and the transmitted local time derived from the received telemetry signal;

third means for calculating the propagation delay of said telemetry signal between said remote station and said calibrating station;

fourth means responsive to the outputs of said second and third means for detecting a second time difference between said reference time and said local time; and fifth means responsive to said second time difference for transmitting a time calibrating command to said remote station.

2. A remote time calibrating system as claimed in claim 1, wherein said second means comprises:

a first latching circuit means responsive to said received telemetry signal for latching said receive reference time; a second latching circuit means for latching said transmitted local time in response to a latching pulse supplied from said first means; and a calculation circuit means coupled to both said first and second latching circuit means for performing the subtraction between the outputs of these latching circuit means to provide said first time difference.

3. A remote time calibrating system as claimed in claim 1, wherein said time calibrating command comprises;

address bits indicating the address of said remote station;

a backup system selecting bit following said address bits and indicating whether an operating system or backup system is to be used;

command code bits indicating the content of said time calibrating command;

function code bits inserted between said backup system selecting bit and said command code bits and indicating the function of said command code bits; and check code bits following said command code bits.

4. A remote time calibrating system as claimed in claim 1, wherein said time adjusting means comprises:

a time oscillator means for generating a clock pulse;

a presettable time counter means for counting said clock pulse to provide the data of said local time, said presettable time counter means being preset in response to a preset trigger pulse;

a time data latching circuit means for latching the output data of said presettable time counter means in response to a timing pulse which represents the leading point of said telemetry signal;

a 3-state buffer means for temporarily storing the output data of said time data latching circuit; and a central processing unit means responsive to said time calibrating command and to the output data of said 3-state buffer means for generating calibrated time data and for providing said presettable time counter means with said preset trigger pulse to load said calibrated time data on said presettable time counter.

5. A remote time calibrating system as claimed in claim 1, wherein said time calibrating command is a delay command signal, and means in said remote station responsive to said delay command signal for causing said remote station to adjust said local time to said reference time, at a predetermined later time.

6. A remote time calibrating system as claimed in claim 1, wherein said telemetry signal is modulated with pulse code modulation (PCM) signals, the bit rate of said PCM signals being $2^n$ where n is a positive integer.

7. A process for adjusting the times in a calibration command station and a remotely calibrated station to render these times identical with each other, said process comprising the steps of:

(a) transmitting telemetry signals from said remote station to said command station;

(b) inserting signals representing the local time of said remote station into the telemetry signals upon their transmission from said remote station;

(c) detecting at said command station any difference between the actual receipt time of said telemetered signals and the time indicated by the local time signals inserted into said telemetered signals;

(d) calculating at said command station the propagation time for said telemetered signals;

(e) subtracting the propagation time calculated in step (d) from the difference detected in step (c);

(f) transmitting a calibration signal from said command station to said remote station responsive to the subtraction of step (e); and (g) adjusting the time of said calibrated station to be identical with the time of said command station responsive to said calibration signal.

8. The process of claim 7 and the added steps responsive to the receipt of said telemetry signals at said command station of storing both said actual receipt time and said inserted local time signals and of supplying said stored signals to enable said detection of step (c).

* * * * *